(No Model.)
W. H. McGREW.
WASHING MACHINE.
No. 262,968. Patented Aug. 22, 1882.
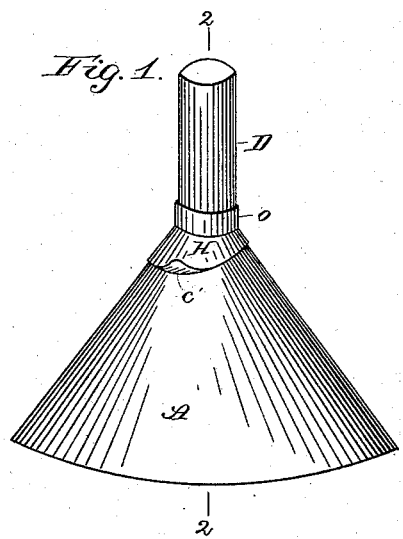
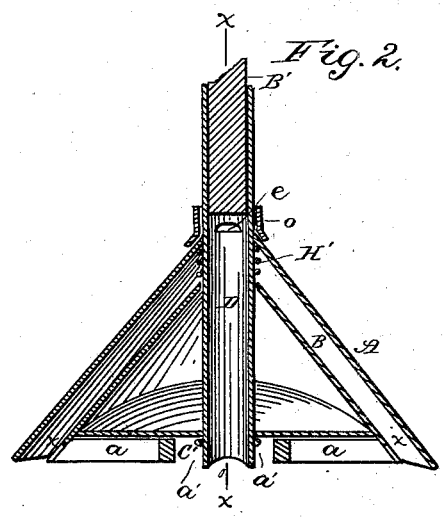
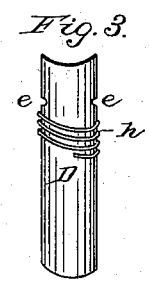
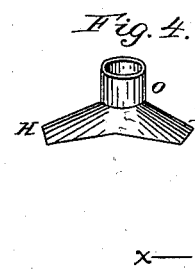
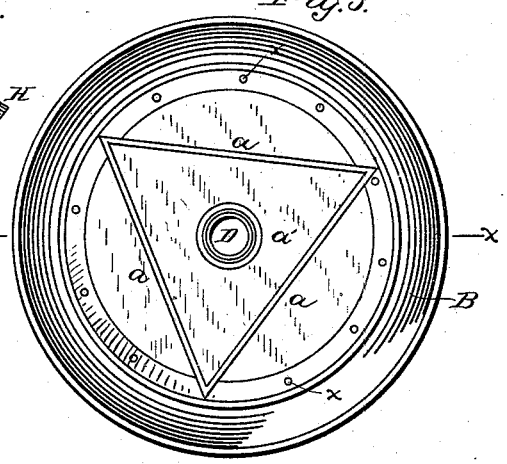
Witnesses:
J. W. Garner
Will. A. Craig
Inventor:
W. H. McGrew
By H. J. Tunis
atty.

UNITED STATES PATENT OFFICE.

WILLIAM H. McGREW, OF PERU, INDIANA.

WASHING-MACHINE.

SPECIFICATION forming part of Letters Patent No. 262,968, dated August 22, 1882.

Application filed March 18, 1882. (No model.)

*To all whom it may concern:*

Be it known that I, WILLIAM H. MCGREW, of Peru, county of Miami, and State of Indiana, have invented a certain Improvement in Atmospheric Funnel-Washers, of which the following is a specification.

The nature of this invention relates to that class of machines known as "atmospheric washers," having an outer and an inner funnel. Said funnels are secured to a handle, and the machine is operated by pressing down and raising the washer from off the garments immersed for washing.

My present invention consists in the radical construction of parts, all of which will be hereinafter described.

I am fully aware that atmospheric washers have been patented, and am also aware of the objectionable features, and to overcome them is the main object of my invention.

In order that others may know how to use and construct my invention, (being skilled in the art,) I will proceed to describe its construction and operation by reference to the several drawings forming a part of this specification, in which—

Figure 1 is an elevated view of the washer, having the handle removed; and Fig. 2 is a sectional view of the same, through Fig. 5, on line $x$ $x$. Fig. 3 shows a detached portion of the central washer-tube and coiled spring, showing a side view of Fig. 2 on line $x$ $x$. Fig. 4 is a detached side view of thimble and caps fitting over the tube D and openings $e$, as shown in Fig. 1. Fig. 5 is an inverted plan view of the washer as shown in Fig. 1.

This washer has two funnels, A and B, as best shown in Fig. 2. This machine is made of metal, heavy tin being preferable. Attached to the outer funnel, and passing down through the center of the same, is a tube, D, which extends from the bottom of the outer funnel through the neck far enough to receive the wooden handle B', by which the washer is operated. The handle is forced into the tube, leaving the lower end just above the vent-holes $e$ cut through the tube D, being located just over or above the outer funnel at the neck. (See Figs. 2 and 3.) These openings are vent-holes to admit the air and to allow the escape of water that may be driven up the tube by the action of the air while pressing down, as in washing. I provide the openings $e$ $e$ with the caps H H, as shown in Fig. 1, and a detached view of the caps and rim O is shown in Fig. 4. This part of my invention is designed to prevent the water escaping through the openings $e$ $e$ from flying upon the operator. These caps are made arching, and may be soldered to the outer funnel, or may be attached to a rim, O, as shown in Fig. 4. These caps return the water down on the outer funnel, where it finds its way back into the wash tub or vessel. I employ another funnel, B, of the same form as the outer one, excepting smaller in diameter. This is provided with a hole at the neck which receives the tube D. The inner funnel, being smaller, leaves an air-chamber between said funnels.

Around the tube D, inside the outer funnel, is a coiled spring, $h$, as shown in Figs. 2 and 3, Fig. 3 being a view of the tube D on line $x$ $x$ of Fig. 2; and against this spring the neck of the inner funnel is also pressed, as shown in Fig. 2, the object of which will be hereinafter described.

The inner funnel is provided with a bottom, C. Said bottom has a hole through the center and receives the lower portion of the tube D. The bottom is placed slightly above the lower edge of the inner funnel, as shown in Figs. 2 and 5, and around the periphery of the inner funnel and just below the bottom C is a series of holes, $x$ $x$, designed as a passage for air and water.

To prevent the inner funnel from dropping out when the washer is raised, I provide the lower end of the tube D with a collar, $a'$, as shown in Figs. 2 and 5, which holds it in place. I employ three guards, $a$ $a$ $a$. They are fitted to the under side of the bottom C of the inner funnel, and are placed across the bottom in the form of a triangle. (See Figs. 2 and 5.) These guards extend downward as far as the rim of the outer funnel. (See Fig. 2.) They are intended to keep the garments being washed from filling the circle below the inner-funnel rim and from closing up the bottom of the tube D. They also act as beaters. I am aware the most difficulty found with washers of this class has been in raising them from off the garments while washing. As the air is expelled in forcing the washer down a vacuum is formed, thus causing them to raise hard, and to overcome this difficulty is one object of my invention. I employ the central vent-tube, D, having a coiled spring, which presses the inner funnel down, (as the washer is being raised,) forcing the clothes from the vent-tube D by the guards $a\,a\,a$ being pressed upon them by the action of the coiled spring $h$, when the air finds free access, and the washer may be easily raised. When the washer is pressed upon the clothes immersed the inner funnel rises from the collar $a'$, as shown in Fig. 2.

Having described my invention in the most exact terms that I can give, what I claim as new, and desire a Patent for, is—

The clothes-pounder consisting of the central tube, D, having vent-holes $e\,e$ and ring, the outer rigid funnel A, hood H, inner movable funnel, B, provided with vent-holes and guard $a$, and the spring $h$, located between said funnels, all constructed and operating substantially as set forth.

WILLIAM H. McGREW.

Witnesses:
EDGAR S. WHEELER,
ETHAN L. REASONER,
ALEX. R. WILSON.